United States Patent

Flack

Patent Number: 5,478,669
Date of Patent: Dec. 26, 1995

[54] CYLINDRICAL CELL WITH IMPROVED CLOSURE ASSEMBLY

[75] Inventor: Robert Flack, Markham, Canada

[73] Assignee: Battery Technologies Inc., Richmond Hill, Canada

[21] Appl. No.: 244,858
[22] PCT Filed: Dec. 21, 1992
[86] PCT No.: PCT/CA92/00550
§ 371 Date: Jun. 16, 1994
§ 102(e) Date: Jun. 16, 1994
[87] PCT Pub. No.: WO93/12549
PCT Pub. Date: Jun. 24, 1993

[30] Foreign Application Priority Data

Dec. 19, 1991 [HU] Hungary ................................. 4042/91

[51] Int. Cl.⁶ ..................................................... H01M 2/08
[52] U.S. Cl. .......................... 429/174; 429/180; 429/181
[58] Field of Search ..................................... 429/171, 172, 429/173, 174, 180, 181

[56] References Cited

U.S. PATENT DOCUMENTS

| | | | |
|---|---|---|---|
| 2,026,615 | 1/1936 | Corigliano et al. | 429/172 |
| 3,660,168 | 5/1972 | Ralston et al. | 429/172 X |
| 3,694,267 | 9/1972 | Angelovich | 429/172 X |
| 4,227,701 | 10/1980 | Tsuchida et al. | 277/12 |
| 5,080,985 | 1/1992 | Wiacek et al. | 429/172 |
| 5,150,602 | 9/1992 | Payne et al. | 29/623.2 |
| 5,272,020 | 12/1993 | Flack | 429/174 X |

FOREIGN PATENT DOCUMENTS

| | | |
|---|---|---|
| 0037121 | 3/1981 | European Pat. Off. . |
| 2400263 | 8/1978 | France . |
| 1950359 | 1/1971 | Germany . |
| 60-257062 | 12/1985 | Japan . |
| 851253 | 11/1958 | United Kingdom . |
| 2139807 | 11/1984 | United Kingdom . |
| 1249690 | 4/1989 | United Kingdom . |

Primary Examiner—Stephen Kalafut
Attorney, Agent, or Firm—Donald E. Hewson

[57] ABSTRACT

An electrochemical cell of cylindrical type, with a metal can, an anode, a separator and a cathode arranged concentrically in one another, an aqueous alkaline electrolyte solution, and a closure assembly. The closure assembly comprises a plastic top inserted in the open end of the can and has an outer cylindrical zone, a lower rim, a central portion defining a central bore, and an intermediate portion interconnecting the central portion with the lower rim. A current collector nail is inserted through the central bore and penetrates into the anode. A negative cap of a metal sheet material forms the negative terminal of the cell. The negative cap has a flange portion ending in an inwardly bent rim, the can has a bead at a specific distance from its open end, and the bead serves as an abutment member for the closure assembly when inserted in the can. The plastic top defines a conforming support surface for the inwardly bent rim substantially at the connection zone of the outer cylindrical zone and the lower rim. The can has a gasket zone above the bead, and a sealant is provided to cover the inside surface of the can at the gasket zone. The end portion of the gasket zone is crimped over the inwardly bent rim so that the outer cylindrical zone of the plastic top is pressed and crimped therebetween, whereby the inwardly bent rim provides a spring action pressing the outer cylindrical zone in radial direction towards the gasket zone and in axial direction towards the bead.

9 Claims, 2 Drawing Sheets

CYLINDRICAL CELL WITH IMPROVED CLOSURE ASSEMBLY

This application is a national phase application of PCT/CA92/00550, published as WO 93/12549.

FIELD OF THE INVENTION

The invention relates to a cylindrical cell with improved closure assembly.

BACKGROUND OF THE INVENTION

The leakage proof closure of cylindrical cells with an aqueous alkaline electrolyte solution has long been the objective of research and development activity, as can be demonstrated by a large number of patents. The different cell closure types of commercially available cylindrical cells released by major manufacturing companies embody the most up to date technical solutions.

The available cell closure assemblies have the following main common properties:

All of them use a cap formed from a metal sheet that is the negative terminal of cells. The cap has a disc-like central portion, and a flange portion extending towards the interior of the cylindrical can;

A plastic top is used for electrically insulting the cathode from the anode and for providing a sealing gasket. In most designs, a blow out vent is provided in the plastic top that ruptures if the inner gas pressure exceeds a predetermined limit;

A sealant, such as asphalt, polyamide or ethyl vinyl alcohol is provided at the inner surface of a gasket zone of the can, and provides a tight sealing between the can and the plastic top if a sufficiently large pressure is maintained between the contacting surfaces to be sealed;

The upper end of the can is crimped over the flange, so that a thin portion of the plastic top provides electrical insulation between the can and the flange. The crimped metal has the task of maintaining the pressure required between the can and the critical portion of the plastic top for a leakage proof sealing.

In LR6 (North American AA) type cells manufactured by Union Carbide Corporation, the flange of the negative cap has a sharp circular edge, and the crimping pressure of the can acts on the outer side of an outer cylindrical portion of the plastic top which is supported from the inside by this edge and by the edge of a washer. The crimping step should be performed carefully, since in case of higher forces the circular edge of the flange can cut through the thin plastic wall and a short circuit will be experienced.

The pressure distribution along this thin plastic wall is uneven, and the maximum pressure is limited by the load bearing ability of the plastic material. After longer use or at elevated temperatures the resiliency of thermoplastic materials decreases, whereby the quality of the sealing can worsen.

In the closure assembly of LR6 cells manufactured by DURACELL Inc., the negative cap is separated from a resilient metal disc used to support the inner wall of the plastic outer cylinder of the plastic top pressed from outside by the crimped can. An outwardly bent portion of the disc presses the wall out in a radial direction; however, an outwardly projecting edge exerts shearing load on the wall of the plastic material. In case of higher pressures this edge might cut the thin plastic wall. The design is capable of providing radial forces only.

In the closure assembly of LR6 cells manufactured by FUJITSU Inc., the negative cap also has an outwardly and upwardly bent flange portion, and the crimping of the can bends the thin plastic wall over this portion so that the upper edge of the bent flange portion is pressed against the thin plastic wall. The edge to wall attachment between a metal and a plastic material is made in such a way that at higher load the edge might tend to cut through the plastic wall, so that such loads should be avoided. This closure assembly is capable of maintaining a radial bias only.

There are a number of other closure designs which combine the aforementioned principles only, and for that reason they also have limited long term leakage proof properties.

The problem of appropriate cell closure acquires an increased significance in mercury free cell technique, since mercury was an efficient material which reduced gassing within the cells. In mercury free cells, specific measures should be taken for reducing hydrogen formation and for recombining any evolved hydrogen gas.

It is the primary object of the present invention to provide a cell closure assembly which has improved performance; i.e. which can provide a better sealing effect and in which the hazard of cell shorts are reduced.

A further object is the improvement of the accuracy and reliability of the blow out vent which should act if the inside gas pressure exceeds a predetermined limit.

According to the invention, an electrochemical cell of the cylindrical type has been provided which comprises a metal can open at one end, an anode, a separator and a cathode, arranged concentrically in one another, an aqueous alkaline electrolyte solution, and a closure assembly hermetically closing the open end of the can. The closure assembly comprises a plastic top inserted in the open end of the can, and has an outer cylindrical zone, a lower rim, a central portion defining a central bore, and an intermediate portion interconnecting the central portion with the lower rim. A current collector nail is inserted through the central bore of the central portion of the closure, and penetrates deeply into the anode. A negative cap of a metal sheet material forms the negative terminal of the cell and closes the central bore. According to the invention, the negative cap has a flange portion ending in an inwardly bent rim. The can has a bead at a selected distance from the open end, which serves as an abutment member for the assembly when inserted into the can. The plastic top defines a conforming support surface for the inwardly bent rim, substantially at the connection zone of the outer cylindrical zone and the lower rim. The can has a gasket zone above the bead, and a sealant is provided to cover the inside surface of the can at the gasket zone. The gasket zone has a crimped end portion bent over the inwardly bent rim so that the outer cylindrical zone of the plastic top is pressed and crimped therebetween, whereby the inwardly bent rim provides a spring action pressing the outer cylindrical zone in radial direction towards the gasket zone, and in axial direction towards the bead.

In a preferred embodiment, the intermediate portion of the plastic top comprises a blow out vent provided by a section with a thinner wall thickness.

To provide perfect sealing, a sealant is placed between the central bore of the plastic top and the corresponding portion of the current collector nail.

It is preferable if the lower rim is pressed against the upper end portion of the cathode.

Further, in the preferred embodiment, the lower rim defines an upwardly tapering inner surface, the separator extends over the end zone of the anode, and the upper end zone thereof is abutted to the tapering inner surface of the lower rim.

It is good practice that the upper end of the cathode is provided with a chamfer zone having a profile at least partially conforming to the profile of the lower rim.

Yet further, in the preferred embodiment, the current collector nail has a head portion abutting the upper face of the central portion of the plastic top, and the upper face of the head portion is attached to and electrically connected with the negative cap.

The design is most useful in a manganese dioxide-zinc alkaline primary or rechargeable cell; and is important when the cell is mercury free.

The cell closed by the closure assembly according to the present invention has leakage proof properties that well exceed those of commercially available types, and these improved properties do not require sophisticated design or high cost manufacture.

BRIEF DESCRIPTION OF THE DRAWINGS

Further advantages and properties of the cell according to the invention will be apparent from the detailed description of A preferred embodiment, in which reference will be made to the accompanying drawings. In the drawing.

DESCRIPTION OF THE PREFERRED EMBODIMENTS

Figure 1:
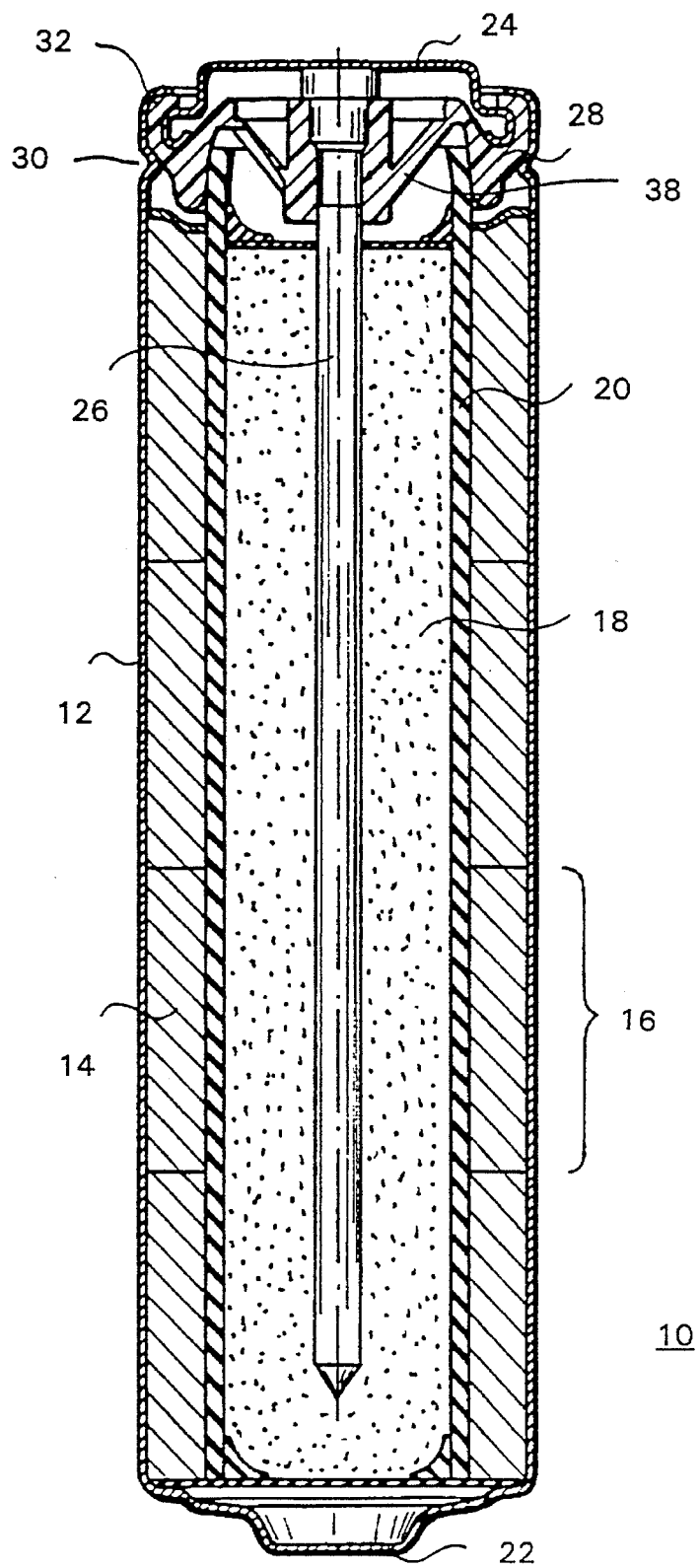
FIG. 1 shows a sectional elevation view of an LR6 cell made according to the invention.

FIG. 1 shows an LR6 (AA type) size alkaline manganese dioxide-zinc cell 10. The cell comprises the following main units: a steel can 12 defining a cylindrical inner space, a manganese dioxide cathode 14 formed by a plurality of hollow cylindrical pellets 16 pressed in the can, a zinc anode 18 made of an anode gel and arranged in the hollow interior of the cathode 14, and a cylindrical separator 20 separating the anode 18 from the cathode 14. The ionic conductivity between the anode and the cathode is provided by the presence of potassium hydroxide electrolyte added into the cell in a predetermined quantity.

The can 12 is closed at the bottom and it has a central circular pip 22 serving as positive terminal. The upper end of the can 12 is hermetically sealed by a cell closure assembly which comprises a negative cap 24 formed by a thin metal sheet, a current collector nail 26 penetrating into the anode gel to provide electrical contact with the anode 18, and a plastic top 28 electrically insulating the negative cap 24 from the can 12 and separating gas spaces 44 and 43 formed beyond the cathode and anode, respectively.

Figure 2:
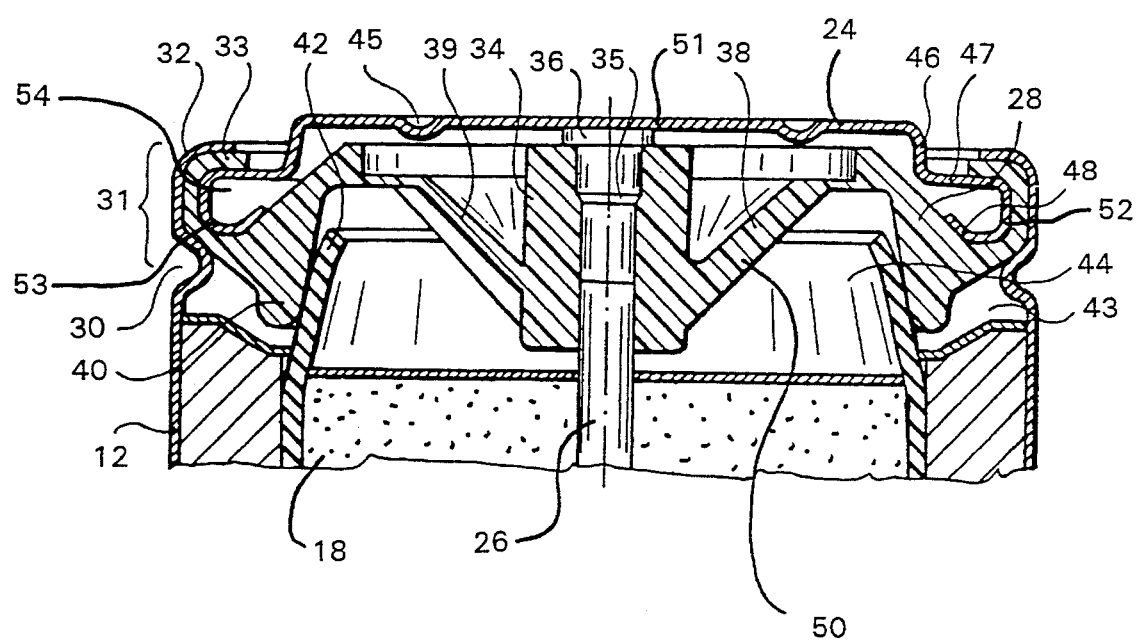
FIG. 2 is an enlarged sectional view of the upper part of a similarly designed LR 14 type cell.

FIG. 2 is an enlarged view of the upper portion of a C size cell (LR 14 type) which is similar to that shown in FIG. 1, wherein the cell closure system is illustrated in greater detail.

A bead 30 is provided at the upper portion of the can 12 which, when viewed from outside, looks like a recessed ring. The inwardly projecting portion of bead 30 serves as an abutting member for the plastic top 28 when inserted in the can 12. A substantially cylindrical gasket zone 31 is formed above the bead 30 ending in a crimped portion 32. The plastic top 28 has a hollow cylindrical upper end zone 33 which is bent back as shown in the drawings, when the crimped portion 32 of the can is provided.

The plastic top 28 has a central portion 34 made substantially as a hollow cylinder. A slight step is provided in the axial bore of the central portion 34 abutting a shoulder 35 on the upper end portion of the current collector nail 26. The nail 26 has a head 36 sitting on the upper face of the central portion 34 of the plastic top 28; and in assembled state, the head 36 of the nail 26 is pressed to the internal surface of the negative cap 24 which provides a stable electrical contact between the nail 26 and the negative cap 24.

An upwardly flaring supporting cone 38 extends out from the lower end zone of the central portion 34 to interconnect the central portion 34 of the plastic top 28 with the outer portion thereof. The cone 38 has a substantially uniform thickness as shown at reference numeral 50, with the exception of a blow out vent 39, wherein the wall thickness is thinner. The thickness of the blow out vent 39 is sufficient to resist a pressure of about 4 MPa, but it blows out if the pressure reaches 4–5 MPa.

The internal surface of the lower rim 40 is slightly conical so that it provides support and a guide for the upwardly tapering upper end portion 42 of the separator 20 extending beyond the upper end of the anode 18.

The negative cap 24 is formed as an integral member from a metal sheet and comprises the following main portions: a central disc portion 51 forming the face and defined by a shallow groove 45, a short cylindrical portion 46 coaxial with the cell axis, and a flange portion 47 with an inwardly bent rim 48. The rim 48 has a cylindrical portion 52 fitting to the interior of the cylindrical end zone 33 of the plastic cap 28, a short ring portion 53 parallel to the flange 47, and an upwardly inclined flare portion 54 fitting to the conical outer surface of the lower rim 40 of the plastic cap 28. The flange 47 together with the inwardly bent rim 48 defines an almost closed channel, whereby this zone of the cap 24 can act as a resilient spring both in radial and axial directions.

The radial components of the spring forces press the end zone 33 of the plastic cap 28 to the interior of gasket zone 31 of the can, which is covered by an appropriate sealant material, and this pressure maintains a perfect sealing effect. The long term fatigue of the wall of the end zone 33 of the plastic top 28 cannot decrease the sealing effect because the biasing force of the negative cap 24 maintains the required pressure. The axial components of the spring forces maintain pressure on the plastic top 28 and the bead 30. It can be seen that the thin end zone 33 of the plastic top 28 is exposed only to substantially evenly distributed pressure forces; and unlike prior art structures, neither shearing forces nor sudden pressure peaks will act on the plastic material. Such a load distribution minimizes cell short circuits during assembly and long term use, it i.e. provides an increased reliability.

The mounting of the cell closure can be carried out as follows:

The main elements of the cell, namely the cathode, separator and anode, are inserted in the can before the bead 30 is made. With the cell components substantially in their final positions, the bead 30 is provided by using an appropriate tool. The next step is the assembly of the plastic top 28 with the current collector nail 26 and the negative cap 24 welded to it. The surface of the upper portion of the nail (up to about the shoulder 35) is covered by an appropriate sealant (e.g., hot melt or asphalt) and the nail 26 that is welded to the negative cap 24 is inserted in the central bore of the plastic top 28 by applying a sufficient pressure. The interior of the can at the gasket zone 31 is covered by a sealant, whereafter the plastic top 28 together with the nail 26 is inserted in the cell as shown in the drawing until the plastic top 28 abuts the inner surface of the bead 30. The next and final step is the crimping of the upper end portion 32 of the can 12 over the bent rim 48 of the negative cap 24, so that the wall of the end zone 33 of the plastic top 28 gets pressed between the two metals.

The above described design of the cell closure provides the following main advantages:

a high degree of leakage prevention is provided by having a bias force pressing evenly against the thin end wall of the plastic top, and this pressure is maintained if the plastic relaxes (e.g., on elevated temperature) and loses its resiliency;

the perfect sealing prevents the interior of the cell from any contamination that would otherwise come from air penetration;

the hazard of cutting through the wall of the plastic top during manufacturing or use at elevated temperatures is practically eliminated; and the safety vent is located at a portion of the plastic top which lies within the boundaries of the separator tube, and this increases the prevention of anode gel leakage to reach the cathode area.

To establish the basic properties of the cell closure structure according to the invention, LR6 size test cells were made, in which the cone portion 38 of the plastic top 28 did not comprise the blow out vent 39, i.e. it was made with uniform wall thickness. The can 12 was provided with a sealed connection to a high pressure nitrogen gas source by opening the bottom pip portion 22, and the inner gas pressure was increased and the pressure values were recorded. The cell closure proved to be gastight up to 9 MPa. At this pressure, gas release was experienced. The blow out pressure of the vent 39 was tested similarly, and a safe venting effect was experienced at pressures slightly exceeding 4 MPa.

Comparative leakage tests were carried out with LR6 size cells closed according to the present invention, using temperature cycling tests. The temperature was changed every day so that cells were exposed for 10 hours to a temperature of +65° C., and for the remaining 14 hours to −40° C. The temperature cycling was carried out through 20 days on 20 cells, and after the 20th day only one of the cells leaked.

Similar temperature cycling tests were made with various types of commercially available LR6 size cells, and by the end of the third day all tested cells leaked.

What is claimed is:

1. An electrochemical cell (10) of cylindrical type, comprising a metal can (12) open at one end, an anode (18), a separator (20) and a cathode (14), arranged concentrically in one another, an aqueous alkaline electrolyte solution, and a closure assembly hermetically closing said open end of the can;

wherein said closure assembly comprises a plastic top (28) inserted in the open end of the can and having an outer cylindrical zone (31), a lower rim (40), a central portion (34) defining a central bore, and an intermediate portion interconnecting said central portion with said lower rim, a current collect nail (26) inserted through said central bore of said central portion and penetrating into said anode, and a negative cap (24) of a metal shoot material forming the negative terminal of the cell and closing said opening;

characterized in, that said negative cap has a flange portion (47) ending in an inwardly bent rim (48), said can has a bead (30) at a selected distance from said open end serving as an abutment member for said assembly when inserted in the can, said plastic top defines a conforming support surface for said inwardly bent rim substantially at a connection zone of said outer cylindrical zone and said lower rim, and said can has a gasket zone (31) above said bead;

wherein a sealant is provided to cover the inside surface of said can at said gasket zone, and the end portion of said gasket zone is crimped over said inwardly bent rim so that said outer cylindrical zone of said plastic top is pressed and crimped therebetween;

whereby said inwardly bent rim provides a spring action pressing said outer cylindrical zone in radial direction towards said gasket and in axial direction towards said bead.

2. The cell as claimed in claim 1, wherein said intermediate portion of the plastic top comprises a blow out vent (39) provided by a section thereof having thinner wall thickness.

3. The cell as claimed in claim 1, wherein a sealant is placed between said central bore of the plastic top and the corresponding portion of the current collector nail.

4. The cell as claimed in claim 1, wherein said central portion extends to about said anode.

5. The cell as claimed in claim 1, wherein said current collector nail has a head portion (36) abutting the upper face of the central portion of the plastic top, and the upper face of the head portion is attached to and electrically connected with said negative cap.

6. The cell as claimed in claim 1, where said cell is a manganese dioxide-zinc cell.

7. The cell as claimed in claim 6, wherein said cell is a primary cell.

8. The cell as claimed in claim 6, wherein said cell is a rechargeable cell.

9. The cell as claimed in claim 6, wherein said cell is a mercury free cell.

* * * * *